US012646748B2

(12) United States Patent
Wu et al.

(10) Patent No.: US 12,646,748 B2
(45) Date of Patent: Jun. 2, 2026

(54) VANADIUM ELECTROLYTE, PREPARATION PROCESS AND USE THEREOF

(71) Applicant: Hunan Province Yinfeng New Energy Co., Ltd, Changsha City (CN)

(72) Inventors: Xiongwei Wu, Changsha City (CN); Hui Xu, Changsha City (CN); Hao Xie, Changsha City (CN); Shanguang Lv, Changsha City (CN); Xuewen Wu, Changsha City (CN); Na Fu, Changsha City (CN)

(73) Assignee: HUNAN PROVINCE YINFENG NEW ENEGERY CO., LTD., Changsha (CN)

( * ) Notice: Subject to any disclaimer, the term of this patent is extended or adjusted under 35 U.S.C. 154(b) by 524 days.

(21) Appl. No.: 18/213,160

(22) Filed: Jun. 22, 2023

(65) Prior Publication Data

US 2024/0113326 A1    Apr. 4, 2024

(30) Foreign Application Priority Data

Sep. 30, 2022    (CN) .......................... 202211209048.4

(51) Int. Cl.
*H01M 10/0562*      (2010.01)
*H01M 10/054*       (2010.01)
*H01M 8/18*         (2006.01)

(52) U.S. Cl.
CPC ..... *H01M 10/0562* (2013.01); *H01M 10/054* (2013.01); *H01M 8/188* (2013.01); *H01M*

*2300/0002* (2013.01); *H01M 2300/0068* (2013.01); *Y02E 60/50* (2013.01)

(58) Field of Classification Search
CPC ........... H01M 10/054; H01M 10/0562; H01M 2300/0002; H01M 2300/0068; H01M 8/188; Y02E 60/50
See application file for complete search history.

(56) References Cited

U.S. PATENT DOCUMENTS

2018/0135149 A1 * 5/2018 Oriji ........................ C22B 34/22

* cited by examiner

*Primary Examiner* — Lingwen R Zeng
(74) *Attorney, Agent, or Firm* — Flener IP & Business Law

(57) ABSTRACT

The present disclosure provides a vanadium electrolyte, a preparation method and use thereof. The method includes: adding sulfuric acid into vanadium-containing ore, and stirring to obtain a mixture; curing the mixture to obtain a clinker; leaching the clinker with water to obtain a vanadium-containing leaching solution; adding a first impurity-removing agent into the vanadium-containing leaching solution to obtain a first purified solution; adding an oxidizing agent, a ferric phosphate dihydrate seed crystal and a second impurity-removing agent into the first purified solution to obtain a second purified solution; adding a reducing agent and a flocculating agent into the second purified solution, and filtering a resultant solution to obtain a filtered solution; mixing the filtered solution with an extraction liquid to obtain a vanadium-supported organic phase; stripping the vanadium-supported organic phase to obtain a stripping liquid; and removing an organic phase from the stripping liquid to obtain the vanadium electrolyte.

10 Claims, No Drawings

VANADIUM ELECTROLYTE, PREPARATION PROCESS AND USE THEREOF

TECHNICAL FIELD

The present disclosure relates to the field of metallurgical technology, in particular to a vanadium electrolyte, a preparation process and use thereof.

BACKGROUND

As a rapidly-growing environmentally-friendly accumulator, a vanadium battery has such characteristics as adjustable storage capacitor and power, lossless deep discharge at a large current, convenient operation and maintenance, high security, high reliability, long service life and low pollution, and it is advantageous over the other batteries in terms of large-scale energy storage. However, its use is limited due to the manufacture cost. As a core energy storage module of the vanadium battery, a vanadium electrolyte accounts for 41% of a total cost of the vanadium battery. Hence, it is very important to control the manufacture cost of the vanadium electrolyte for the industrial and massive application of the vanadium battery.

Currently, high-purity vanadium pentoxide is prepared using ammonium metavanadate or a vanadium pentoxide crude product, and then the vanadium electrolyte is prepared using the high-purity vanadium pentoxide through such a process as dissolution at a low temperature, electrolysis, or dissolution at a high temperature to prepare the vanadium electrolyte.

These processes are complex and expensive, and meanwhile ammonium metavanadate or the vanadium pentoxide solution is obtained using vanadium-containing ore or vanadium-containing waste through a series of complex metallurgical processes, so it is difficult to control the manufacture cost of the vanadium electrolyte.

SUMMARY

An object of the present disclosure is to provide a vanadium electrolyte, a preparation method and use thereof, so as to simplify the preparation of the vanadium electrolyte and reduce the manufacture cost thereof.

In order to solve the above-mentioned problems, the present disclosure provides the following technical solutions.

In one aspect, the present disclosure provides in some embodiments a method for preparing a vanadium electrolyte, including: (1) adding sulfuric acid into vanadium-containing ore, and stirring to obtain a mixture; (2) curing the mixture to obtain a clinker; (3) leaching the clinker with water to obtain a vanadium-containing leaching solution; (4) adding a first impurity-removing agent into the vanadium-containing leaching solution to obtain a first purified solution; (5) adding an oxidizing agent, a ferric phosphate dihydrate seed crystal and a second impurity-removing agent into the first purified solution to obtain a second purified solution; (6) adding a reducing agent and a flocculating agent into the second purified solution, and filtering a resultant solution to obtain a filtered solution; (7) mixing the filtered solution with an extraction liquid to obtain a vanadium-supported organic phase; (8) stripping the vanadium-supported organic phase to obtain a stripping liquid; and (9) removing an organic phase from the stripping liquid to obtain the vanadium electrolyte.

In a possible embodiment of the present disclosure, sulfuric acid is a sulfuric acid solution having a mass concentration of 90% to 98%.

In a possible embodiment of the present disclosure, in (1), a mass ratio of the sulfuric acid solution to the vanadium-containing ore is 1:4 to 1:20.

In a possible embodiment of the present disclosure, in (1), the mixture is at a temperature of 50° C. to 130° C. when sulfuric acid is added.

In a possible embodiment of the present disclosure, sulfuric acid is added at a rate of 0.05-10·mL min$^{-1}$·g$^{-1}$.

In a possible embodiment of the present disclosure, in (1), water is added prior to sulfuric acid.

In a possible embodiment of the present disclosure, a mass ratio of water to the vanadium-containing ore is 0.001:1 to 0.2:1.

In a possible embodiment of the present disclosure, in (1), the vanadium-containing ore is ground.

In a possible embodiment of the present disclosure, the vanadium-containing ore is ground into a powder having a particle size of smaller than 2 mm, and a mass ratio of the powder having a particle size of 1 mm to 2 mm to the vanadium-containing ore is more than 50%.

In a possible embodiment of the present disclosure, in (2), the mixture is cured at a temperature of 40° C. to 130° C. for more than 12 h.

In a possible embodiment of the present disclosure, the mixture is cured in a wet environment.

In a possible embodiment of the present disclosure, in (2), the clinker is ground.

In a possible embodiment of the present disclosure, the clinker is ground into a powder having a particle size smaller than 5 mm.

In a possible embodiment of the present disclosure, in (3), a mass ratio of water to the clinker is 0.5:1 to 5:1.

In a possible embodiment of the present disclosure, in (3), the clinker is leached at a temperature of 10° C. to 90° C.

In a possible embodiment of the present disclosure, in (4), the first impurity-removing agent is added after adjusting a pH value of the vanadium-containing leaching solution to 1.0 to 2.0.

In a possible embodiment of the present disclosure, the first impurity-removing agent is one or more selected from the group consisting of sodium fluoride, potassium fluoride, ammonium fluoride, lithium fluoride, hydrofluoric acid, sodium hexafluorophosphate and potassium hexafluorophosphate.

In a possible embodiment of the present disclosure, a molar ratio of the first impurity-removing agent to aluminium ions in the vanadium-containing leaching solution is 0.5:1 to 10:1.

In a possible embodiment of the present disclosure, in (4), the first purified solution is filtered.

In a possible embodiment of the present disclosure, in (4), an impurity-removing reaction is performed at a temperature of 5° C. to 90° C. after adding the first impurity-removing agent.

In a possible embodiment of the present disclosure, in (4), a pH value of the vanadium-containing leaching solution is adjusted to 1.0 to 2.0 using the vanadium-containing ore, and the vanadium-containing leaching solution and a wet ore material are obtained solid-liquid separation.

In a possible embodiment of the present disclosure, in (5), the oxidizing agent is selected from one or more of the group consisting of sodium chlorate, sodium hypochlorite and hydrogen peroxide.

In a possible embodiment of the present disclosure, the second impurity-removing agent is one or more selected from the group consisting of phosphoric acid, sodium phosphate, disodium hydrogen phosphate, monosodium hydrogen phosphate, potassium phosphate, dipotassium hydrogen phosphate, monopotassium hydrogen phosphate, and ammonium hydrogen phosphate.

In a possible embodiment of the present disclosure, a molar ratio of the oxidizing agent to ferrous ions in the first purified solution is 0.2:1 to 1:1.

In a possible embodiment of the present disclosure, a molar ratio of the second impurity-removing agent to ferric ions in the first purified solution is 0.5:1 to 2:1.

In a possible embodiment of the present disclosure, a molar ratio of the ferric phosphate dihydrate seed crystal to ferric ions in the first purified solution is 0.01:1 to 0.2:1.

In a possible embodiment of the present disclosure, in (5), a pH value of the first purified solution is adjusted to 1.5 to 2.5 after adding the oxidizing agent.

In a possible embodiment of the present disclosure, in (5), a resultant solution obtained after adding the second impurity-removing agent is filtered.

In a possible embodiment of the present disclosure, in (5), an impurity-removing reaction is performed at a temperature of 5° C. to 90° C. after adding the second impurity-removing agent.

In a possible embodiment of the present disclosure, in (6), the reducing agent is one or more selected from the group consisting of sulfite, sulfur dioxide, elemental sulfur, a zinc powder, an organosulfur compound, oxalate, ascorbic acid and carbon monoxide.

In a possible embodiment of the present disclosure, the flocculating agent is one or more selecting the group consisting of polyacrylamide and sodium polyacrylate.

In a possible embodiment of the present disclosure, a molar ratio of the reducing agent to pentavalent vanadium ions in the second purified solution is 1:1 to 3:1.

In a possible embodiment of the present disclosure, a molar ratio of the flocculating agent to vanadium ions in the second purified solution is 0.01:1 to 0.1:1.

In a possible embodiment of the present disclosure, in (6), a pH value of the second purified solution is adjusted to 1.7 to 2.2 after adding the reducing agent.

In a possible embodiment of the present disclosure, in (6), the resultant solution is stirred for 1 h to 2 h after adding the flocculating agent, and filtered using an ultrafiltration membrane to obtain the filtered solution.

In a possible embodiment of the present disclosure, the extraction liquid is a mixture of an extraction agent, tributyl phosphate and sulfonated kerosene, and the extraction agent is one or more selected from the group consisting of bis(2-ethylhexyl) phosphate (P204), trioctylamine (N235) and 2-ethylhexyl phosphate 2-ethylhexyl ester (P507).

In a possible embodiment of the present disclosure, the extraction liquid includes 10 to 20 parts by weight of the extraction agent, 4 to 10 parts by weight of tributyl phosphate, and 65 to 86 parts by weight of sulfonated kerosene.

In a possible embodiment of the present disclosure, in (7), a volume ratio of the filtered solution to the extraction liquid is 1:0.2 to 1:1.

In a possible embodiment of the present disclosure, the vanadium-supported organic phase is washed with a sulfuric acid solution having a pH value of 1.5 to 2.0, and then stripped with a sulfuric acid solution at a concentration of 1.5 mol/L to 2.5 mol/L to obtain the stripping liquid.

In a possible embodiment of the present disclosure, in (8), a volume ratio of the sulfuric acid solution having a pH value of 1.5 to 2.0 to the vanadium-supported organic phase is 0.5:1 to 5:1.

In a possible embodiment of the present disclosure, in (8), a volume ratio of the sulfuric acid solution at a concentration of 1.5 mol/L to 2.5 mol/L to the vanadium-supported organic phase is 0.05:1 to 0.6:1.

In a possible embodiment of the present disclosure, in (9), the stripping liquid is subjected to diffusive dialysis to obtain a dialysate, the dialysate is extracted and stripped to obtain a secondary stripping liquid, and the organic phase is removed from the secondary stripping liquid through an activated carbon adsorption column to obtain the vanadium electrolyte.

In a possible embodiment of the present disclosure, in (9), the sulfuric acid solution is recycled through a diffusive dialysis membrane, and in the diffusive dialysis, a flow rate of the stripping liquid is $0.15$-$0.30*10^{-3}$ $m^3/(h \cdot m^2)$, and a ratio of a flow rate of water to the flow rate of the stripping liquid is 0.5:1 to 1.5:1.

In a possible embodiment of the present disclosure, in (9), water and/or a sulfuric acid solution at a mass concentration of 90% to 98% is added into the vanadium electrolyte to adjust a concentration of vanadium ions in the vanadium electrolyte to 1.3 mol/L to 1.8 mol/L and adjust a concentration of sulfate ions to 4.0 mol/L to 4.5 mol/L.

In another aspect, the present disclosure provides in some embodiments a vanadium electrolyte prepared through the above-mentioned method.

In yet another aspect, the present disclosure provides in some embodiments use of the vanadium electrolyte in a battery.

The present disclosure has the following beneficial effects.

1) The method for preparing the vanadium electrolyte in the embodiments of the present disclosure includes: adding sulfuric acid into the vanadium-containing ore, and stirring to obtain the mixture; curing the mixture to obtain the clinker; leaching the clinker with water to obtain the vanadium-containing leaching solution; adding the first impurity-removing agent into the vanadium-containing leaching solution to obtain the first purified solution; adding the oxidizing agent, the ferric phosphate dihydrate seed crystal and the second impurity-removing agent into the first purified solution to obtain the second purified solution; adding the reducing agent and the flocculating agent into the second purified solution, and filtering the resultant solution to obtain the filtered solution; mixing the filtered solution with the extraction liquid to obtain the vanadium-supported organic phase; stripping the vanadium-supported organic phase to obtain the stripping liquid; and removing the organic phase from the stripping liquid to obtain the vanadium electrolyte. As a result, it is able to remarkably reduce the manufacture cost of the vanadium electrolyte at low energy consumption and low pollution. In addition, it is to improve the purity of the vanadium electrolyte, reduce the content of impurity ions in the vanadium electrolyte, and use the vanadium electrolyte in various environments.

2) For the method in the embodiments of the present disclosure, in (1) to (3), the vanadium-containing ore is used as a raw material to directly prepare the vanadium electrolyte, the vanadium-containing leaching solution mainly includes tetravalent vanadium ions through curing, and a valence of vanadium is consistent with that in the final vanadium electrolyte in the entire process, so it is able to reduce the cost for a redox reaction.

3) For the method in the embodiments of the present disclosure, the vanadium-containing ore is used as a raw material to directly prepare the vanadium electrolyte, so no vanadium deposition process is involved and thereby no ammonia-nitrogen wastewater is generated, i.e., little wastewater needs to be treated in the entire process and merely a raffinate needs to be treated. In addition, the raffinate may also be reused after impurity-removing, i.e., it is able to achieve zero emission and reduce the treatment cost.

4) For the method in the embodiments of the present disclosure, in (1), the vanadium-containing ore is ground into the powder having a particle size of smaller than 2 mm, and the mass ratio of the powder having a particle size of 1 mm to 2 mm to the vanadium-containing ore is more than 50%. Through controlling the particle size of the powder, it is able to reduce the cost for grinding the vanadium-containing ore. In addition, I tis able to achieve the selective leaching of vanadium and reduce the impurities in the vanadium-containing leaching solution, thereby to reduce the cost for the subsequent impurity-removing.

5) For the method in the embodiments of the present disclosure, in (1), the mixture is at a temperature of 50° C. to 130° C. when sulfuric acid is added, and sulfuric acid is added at a rate of 0.05-10 mL·min$^{-1}$·g$^{-1}$. Through controlling a feeding rate of sulfuric acid, the mixture is heated to 50° C. to 130° C., and then in (2), the mixture is cured by making full use of heat generated during the addition of sulfuric acid without any additional heat, so it is able to remarkably reduce the power consumption.

6) For the method in the embodiments of the present disclosure, in (4), the pH value of the vanadium-containing leaching solution is adjusted to 1.0 to 2.0 using the vanadium-containing ore. Through acids in the vanadium-containing ore and the vanadium-containing leaching solution, it is able to reduce the content of acid-consuming substance in the vanadium-containing ore, thereby to reduce the content of acids for the subsequent curing. In addition, it is able to reduce the content of a neutralizer, thereby to reduce the neutralization cost, reduce a loss of vanadium, and meanwhile reduce the content of waste residues.

7) For the method in the embodiments of the present disclosure, in (4) to (6), aluminum, iron and magnesium are removed through chemical deposition before the extraction, so as to prevent the occurrence of co-extraction of vanadium with aluminum, iron and magnesium. In addition, cryolite and ferric phosphate are obtained, i.e., it is able to achieve the recyclable use of resources.

8) For the method in the embodiments of the present disclosure, in (6), the resultant solution is stirred for 1 h to 2 h after adding the flocculating agent, and filtered using the ultrafiltration membrane to obtain the filtered solution. Through the flocculating agent in combination with the ultrafiltration membrane, it is able to effectively remove small particles and a part of anions in the solution, thereby to remove the impurities and prevent the occurrence of emulsification during the extraction.

9) For the method in the embodiments of the present disclosure, in (9), the stripping liquid is subjected to diffusive dialysis to obtain the dialysate, the dialysate is extracted and stripped to obtain the secondary stripping liquid, and the organic phase is removed from the secondary stripping liquid through an activated carbon adsorption column to obtain the vanadium electrolyte. Through the diffusive dialysis, it is able to recycle sulfuric acid in the stripping liquid. On one hand, there is a high concentration of sulfuric acid in the stripping liquid, and if a base is used for neutralization, a large quantity of base needs to be consumed. In addition, the solution has been purified for many times, and the content of impurities is relatively small. If the base is used for neutralization, some other ions may be introduced. Meanwhile, a loss of vanadium may increase, and a large quantity of waste residues may occur. When sulfuric acid in the stripping liquid is recycled through the diffusive dialysis, it is able to reduce the cost without any additional ions, reduce the loss of vanadium, and prevent the occurrence of waste residues. On the other hand, the recycled sulfuric acid may be directly reused without any additional treatment, so it is able to remarkably reduce the consumption of sulfuric acid in the entire process.

10) For the method in the embodiments of the present disclosure, in (9), the obtained dialysate is extracted and stripped to obtain the secondary stripping liquid, so as to remove the impurity ions, and increase the concentration of the vanadium ions in the vanadium electrolyte.

11) For the vanadium electrolyte in the embodiments of the present disclosure, in the impurity ions, the content of iron, aluminum, magnesium, calcium, sodium and potassium is not greater than 30 mg/L, the content of silicon is not greater than 5 mg/L, and the content of the other impurity ions meets the requirement on a first-level product in GB/T 37204-2018 "electrolyte for all-vanadium flow battery". In addition, the content of some impurities in the vanadium electrolyte is far less than the requirement on the first-level product in the standard, especially the impurities which are difficult to be removed, such as iron, aluminum, calcium, sodium, potassium, silicon, chromium and molybdenum.

DETAILED DESCRIPTION

In the embodiments of the present disclosure, if no condition has been specified, the process may be performed under a conventional condition or a condition suggested by a manufacturer. If no manufacturer of a reagent or instrument has been specified, it means that the reagent or instrument is available in the market, and the implementation and the technical effect of the schemes in the embodiments of the present disclosure will not be adversely affected in the case that the raw materials are from different manufacturers and of different types.

Example 1

The present disclosure provides in this example a method for manufacturing a vanadium electrolyte, which includes the following steps.

(1) Grinding vanadium-containing ore into a powder having a particle size of smaller than 2 mm, adding water into the powder, adding a sulfuric acid solution at a mass concentration of 90% at a rate of 0.05 mL·min$^{-1}$·g$^{-1}$, and stirring at a temperature of 50° C. to obtain a mixture. A mass ratio of the powder having a particle size of 1 mm to 2 mm to the vanadium-containing ore is more than 50%.

A mass ratio of water to the vanadium-containing ore is 0.1:1, and a mass ratio of the sulfuric acid solution to the vanadium-containing ore is 1:12.

(2) Curing the mixture to obtain a clinker, and grinding the clinker into a powder having a particle size of smaller than 5 mm.

The mixture is cured in a wet environment at a temperature of 40° C. for more than 12 h.

(3) Leaching the clinker with water at a temperature of 10° C. to obtain a vanadium-containing leaching solution.

A mass ratio of water to the clinker is 0.5:1, and the vanadium-containing leaching solution and a leaching residue are obtained through solid-liquid separation.

(4) Adjusting a pH value of the vanadium-containing leaching solution to 1.0, adding a first impurity-removing agent into the vanadium-containing leaching solution to perform an impurity-removing reaction at a temperature of 5, and filtering a resultant solution to obtain a first purified solution.

The first impurity-removing agent is a mixture of sodium fluoride and ammonium fluoride at a weight ratio of 30:8, and a molar ratio of the first impurity-removing agent to aluminium ions in the vanadium-containing leaching solution is 0.5:1. The aluminium ions in the first impurity-removing agent are removed to obtain cryolite, i.e., sodium fluoroaluminate.

In a possible embodiment of the present disclosure, the pH value of the vanadium-containing leaching solution is adjusted to 1.0 using the vanadium-containing ore in (1). After the pH value has been adjusted to 1.0, the vanadium-containing leaching solution and a wet ore material are obtained through solid-liquid separation. It should be appreciated that, the pH value of the vanadium-containing leaching solution may also be adjusted to 1.0 using a chemical reagent.

In order to make full use of the resources, the vanadium-containing ore in (1) may also be doped with the wet ore material generated in (4).

(5) Adding an oxidizer into the first purified solution, adjusting a pH value of the first purified solution to 2.5, adding a ferric phosphate dihydrate seed crystal and a second impurity-removing agent into the first purified solution, and performing an impurity-removing reaction at a temperature of 5° C., and filtering a resultant reaction liquid to obtain a second purified solution.

The oxidizer is sodium chlorate, and a molar ratio of the oxidizer to ferrous ions in the first purified solution is 0.6:1.

The second impurity-removing agent is sodium phosphate, and a molar ratio of the second impurity-removing agent to ferric ions in the first purified solution is 2:1. The ferric ions are removed through the second impurity-removing agent, so as to obtain ferric phosphate.

A molar ratio of the ferric phosphate dihydrate seed crystal to the ferric ions in the first purified solution is 0.1:1.

(6) Adding a reducing agent into the second purified solution to reduce pentavalent vanadium ions in the second purified solution into tetravalent vanadium ions, adjusting a pH value of the second purified solution to 2.2, adding a flocculating agent, stirring a resultant mixture for 2 h, and filtering the resultant mixture through an ultrafiltration membrane to obtain a filtered solution.

The reducing agent is sodium sulfite, and a molar ratio of the reducing agent to the pentavalent vanadium ions in the second purified solution is 3:1.

The flocculating agent is polyacrylamide, and a molar ratio of the flocculating agent to the vanadium ions in the second purified solution is 0.01:1.

(7) Mixing the filtered solution with an extraction liquid to obtain a vanadium-supported organic phase.

It should be appreciated that, a raffinate is generated during the extraction. In order to make full use of the resources, water in which the impurities are removed through neutralization may be used for leaching in (3), or added into the vanadium-containing ore in (1).

The extraction liquid includes 25 parts by weight of an extraction agent, 4 parts by weight of tributyl phosphate and 65 parts by weight of sulfonated kerosene. The extraction agent is a mixture of P204 and P507 at a weight ratio of 1:9. A volume ratio of the filtered solution to the extraction liquid is 1:0.5.

(8) Washing the vanadium-supported organic phase with a sulfuric acid solution having a pH value of 1.5, and stripping the vanadium-supported organic phase with a sulfuric acid solution at a concentration of 2.0 mol/L, so as to obtain a stripping liquid.

A volume ratio of the sulfuric acid solution having a pH value of 1.5 to the vanadium-supported organic phase is 0.5:1, and a volume ratio of the sulfuric acid solution at a concentration of 2.0 mol/L to the vanadium-supported organic phase is 0.3:1.

In order to make full use of the resources, water for the washing is used for the leaching in (3).

(9) Performing diffusive dialysis on the stripping liquid, recycling the sulfuric solution through a diffusive dialysis membrane to obtain a dialysate, extracting and stripping the dialysate to obtain a secondary stripping liquid, and removing an organic phase from the secondary stripping liquid through an activated carbon adsorption column to obtain the vanadium electrolyte.

In order to obtain the vanadium electrolyte at an appropriate concentration, water and/or a sulfuric acid solution is added into the vanadium electrolyte, so as to adjust a concentration of the vanadium ions in the vanadium electrolyte to 1.8 mol/L and adjust a concentration of sulfate ions to 4.5 mol/L. A mass concentration of the sulfuric acid solution is 98%.

In the diffusive dialysis, a flow rate of the stripping liquid is $0.30*10^{-3}$ m³/(h·m²), and a ratio of a flow rate of water to the flow rate of the stripping liquid is 1:1. In this example, the extraction and stripping are performed to obtain the secondary stripping agent in a same way as that in (7) and (8), or using any other reagent according to the practical need.

In order to make full use of the resources, the sulfuric acid solution recycled through the diffusive dialysis membrane may be used in (1).

Example 2

The present disclosure provides in this example a method for manufacturing a vanadium electrolyte, which includes the following steps.

(1) Grinding vanadium-containing ore into a powder having a particle size of smaller than 2 mm, adding water into the powder, adding a sulfuric acid solution at a mass concentration of 94% at a rate of 10 mL·min⁻¹·g⁻¹, and stirring at a temperature of 130° C. to obtain a mixture. A mass ratio of the powder having a particle size of 1 mm to 2 mm to the vanadium-containing ore is more than 50%.

A mass ratio of water to the vanadium-containing ore is 0.2:1, and a mass ratio of the sulfuric acid solution to the vanadium-containing ore is 1:4.

(2) Curing the mixture to obtain a clinker, and grinding the clinker into a powder having a particle size of smaller than 5 mm.

The mixture is cured in a wet environment at a temperature of 130° C. for more than 12 h.

(3) Leaching the clinker with water at a temperature of 50° C. to obtain a vanadium-containing leaching solution.

A mass ratio of water to the clinker is 5:1, and the vanadium-containing leaching solution and a leaching residue are obtained through solid-liquid separation.

(4) Adjusting a pH value of the vanadium-containing leaching solution to 1.5, adding a first impurity-removing agent into the vanadium-containing leaching solution to perform an impurity-removing reaction at a temperature of 90° C., and filtering a resultant solution to obtain a first purified solution.

The first impurity-removing agent is potassium fluoride. In a possible embodiment of the present disclosure, the first impurity-removing agent is one or more selected from the group consisting of ammonium fluoride, lithium fluoride, hydrofluoric acid, sodium hexafluorophosphate and potassium hexafluorophosphate. A molar ratio of the first impurity-removing agent to aluminium ions in the vanadium-containing leaching solution is 5:1. The aluminium ions in the first impurity-removing agent are removed to obtain cryolite, i.e., sodium fluoroaluminate.

In a possible embodiment of the present disclosure, the pH value of the vanadium-containing leaching solution is adjusted to 1.5 using the vanadium-containing ore in (1). After the pH value has been adjusted to 1.5, the vanadium-containing leaching solution and a wet ore material are obtained through solid-liquid separation. It should be appreciated that, the pH value of the vanadium-containing leaching solution may also be adjusted to 1.5 using a chemical reagent.

In order to make full use of the resources, the vanadium-containing ore in (1) may also be doped with the wet ore material generated in (4).

(5) Adding an oxidizer into the first purified solution, adjusting a pH value of the first purified solution to 2.0, adding a ferric phosphate dihydrate seed crystal and a second impurity-removing agent into the first purified solution, and performing an impurity-removing reaction at a temperature of 90° C., and filtering a resultant reaction liquid to obtain a second purified solution.

The oxidizer is sodium hypochlorite, and a molar ratio of the oxidizer to ferrous ions in the first purified solution is 0.2:1.

The second impurity-removing agent is phosphoric acid. In a possible embodiment of the present disclosure, the second impurity-removing agent is one or more selected from the group consisting of sodium phosphate, disodium hydrogen phosphate, monosodium hydrogen phosphate, potassium phosphate, dipotassium hydrogen phosphate, monopotassium hydrogen phosphate, and ammonium hydrogen phosphate, and a molar ratio of the second impurity-removing agent to ferric ions in the first purified solution is 1.2:1. The ferric ions are removed through the second impurity-removing agent, so as to obtain ferric phosphate.

A molar ratio of the ferric phosphate dihydrate seed crystal to the ferric ions in the first purified solution is 0.2:1.

(6) Adding a reducing agent into the second purified solution to reduce pentavalent vanadium ions in the second purified solution into tetravalent vanadium ions, adjusting a pH value of the second purified solution to 1.7, adding a flocculating agent, stirring a resultant mixture for 2 h, and filtering the resultant mixture through an ultrafiltration membrane to obtain a filtered solution.

The reducing agent is sulfur dioxide. In a possible embodiment of the present disclosure, the reducing agent is one or more selected from the group consisting of elemental sulfur, a zinc powder, an organosulfur compound, oxalate, ascorbic acid and carbon monoxide, and a molar ratio of the reducing agent to the pentavalent vanadium ions in the second purified solution is 1:1.

The flocculating agent is sodium polyacrylate, and a molar ratio of the flocculating agent to the vanadium ions in the second purified solution is 0.1:1.

(7) Mixing the filtered solution with an extraction liquid to obtain a vanadium-supported organic phase.

It should be appreciated that, a raffinate is generated during the extraction. In order to make full use of the resources, water in which the impurities are removed through neutralization may be used for leaching in (3), or added into the vanadium-containing ore in (1).

The extraction liquid includes 18 parts by weight of an extraction agent, 7 parts by weight of tributyl phosphate and 86 parts by weight of sulfonated kerosene. The extraction agent is N235. A volume ratio of the filtered solution to the extraction liquid is 1:0.2.

(8) Washing the vanadium-supported organic phase with a sulfuric acid solution having a pH value of 2.0, and stripping the vanadium-supported organic phase with a sulfuric acid solution at a concentration of 2.5 mol/L, so as to obtain a stripping liquid.

A volume ratio of the sulfuric acid solution having a pH value of 2.0 to the vanadium-supported organic phase is 5:1, and a volume ratio of the sulfuric acid solution at a concentration of 2.5 mol/L to the vanadium-supported organic phase is 0.05:1.

In order to make full use of the resources, water for the washing is used for the leaching in (3).

(9) Performing diffusive dialysis on the stripping liquid, recycling the sulfuric solution through a diffusive dialysis membrane to obtain a dialysate, extracting and stripping the dialysate to obtain a secondary stripping liquid, and removing an organic phase from the secondary stripping liquid through an activated carbon adsorption column to obtain the vanadium electrolyte.

In order to obtain the vanadium electrolyte at an appropriate concentration, water and/or a sulfuric acid solution is added into the vanadium electrolyte, so as to adjust a concentration of the vanadium ions in the vanadium electrolyte to 1.3 mol/L and adjust a concentration of sulfate ions to 4.2 mol/L. A mass concentration of the sulfuric acid solution is 94%.

In the diffusive dialysis, a flow rate of the stripping liquid is $0.15*10^{-3}$ $m^3/(h \cdot m^2)$, and a ratio of a flow rate of water to the flow rate of the stripping liquid is 0.5:1.

In order to make full use of the resources, the sulfuric acid solution recycled through the diffusive dialysis membrane may be used in (1).

Example 3

The present disclosure provides in this example a method for manufacturing a vanadium electrolyte, which includes the following steps.

(1) Grinding vanadium-containing ore into a powder having a particle size of smaller than 2 mm, adding water into the powder, adding a sulfuric acid solution at a mass concentration of 98% at a rate of 5 mL·min$^{-1}$·g$^{-1}$, and stirring at a temperature of 90° C. to obtain a mixture. A mass ratio of the powder having a particle size of 1 mm to 2 mm to the vanadium-containing ore is more than 50%.

A mass ratio of water to the vanadium-containing ore is 0.1:1, and a mass ratio of the sulfuric acid solution to the vanadium-containing ore is 1:20.

(2) Curing the mixture to obtain a clinker, and grinding the clinker into a powder having a particle size of smaller than 5 mm.

The mixture is cured in a wet environment at a temperature of 85° C. for more than 12 h.

(3) Leaching the clinker with water at a temperature of 90° C. to obtain a vanadium-containing leaching solution.

A mass ratio of water to the clinker is 2.5:1, and the vanadium-containing leaching solution and a leaching residue are obtained through solid-liquid separation.

(4) Adjusting a pH value of the vanadium-containing leaching solution to 2.0, adding a first impurity-removing agent into the vanadium-containing leaching solution to perform an impurity-removing reaction at a temperature of 47° C., and filtering a resultant solution to obtain a first purified solution.

The first impurity-removing agent is sodium hexafluorophosphate, and a molar ratio of the first impurity-removing agent to aluminium ions in the vanadium-containing leaching solution is 10:1. The aluminium ions in the first impurity-removing agent are removed to obtain cryolite, i.e., sodium fluoroaluminate.

In a possible embodiment of the present disclosure, the pH value of the vanadium-containing leaching solution is adjusted to 2.0 using the vanadium-containing ore in (1). After the pH value has been adjusted to 2.0, the vanadium-containing leaching solution and a wet ore material are obtained through solid-liquid separation. It should be appreciated that, the pH value of the vanadium-containing leaching solution may also be adjusted to 2.0 using a chemical reagent.

In order to make full use of the resources, the vanadium-containing ore in (1) may also be doped with the wet ore material generated in (4).

(5) Adding an oxidizer into the first purified solution, adjusting a pH value of the first purified solution to 1.5, adding a ferric phosphate dihydrate seed crystal and a second impurity-removing agent into the first purified solution, and performing an impurity-removing reaction at a temperature of 45° C., and filtering a resultant reaction liquid to obtain a second purified solution.

The oxidizer is hydrogen peroxide, and a molar ratio of the oxidizer to ferrous ions in the first purified solution is 1:1.

The second impurity-removing agent is potassium phosphate, and a molar ratio of the second impurity-removing agent to ferric ions in the first purified solution is 0.5:1. The ferric ions are removed through the second impurity-removing agent, so as to obtain ferric phosphate.

A molar ratio of the ferric phosphate dihydrate seed crystal to the ferric ions in the first purified solution is 0.01:1.

(6) Adding a reducing agent into the second purified solution to reduce pentavalent vanadium ions in the second purified solution into tetravalent vanadium ions, adjusting a pH value of the second purified solution to 2.0, adding a flocculating agent, stirring a resultant mixture for 1 h, and filtering the resultant mixture through an ultrafiltration membrane to obtain a filtered solution.

The reducing agent is a mixture of elemental sulfur and a zinc powder at a weight ratio of 1:1, and a molar ratio of the reducing agent to the pentavalent vanadium ions in the second purified solution is 2:1.

The flocculating agent is polyacrylamide, and a molar ratio of the flocculating agent to the vanadium ions in the second purified solution is 0.05:1.

(7) Mixing the filtered solution with an extraction liquid to obtain a vanadium-supported organic phase.

It should be appreciated that, a raffinate is generated during the extraction. In order to make full use of the resources, water in which the impurities are removed through neutralization may be used for leaching in (3), or added into the vanadium-containing ore in (1).

The extraction liquid includes 10 parts by weight of an extraction agent, 10 parts by weight of tributyl phosphate and 76 parts by weight of sulfonated kerosene. The extraction agent is a mixture of P204, N235 and P507 at a weight ratio of 1:3:1. A volume ratio of the filtered solution to the extraction liquid is 1:1.

(8) Washing the vanadium-supported organic phase with a sulfuric acid solution having a pH value of 1.8, and stripping the vanadium-supported organic phase with a sulfuric acid solution at a concentration of 1.5 mol/L, so as to obtain a stripping liquid.

A volume ratio of the sulfuric acid solution having a pH value of 1.8 to the vanadium-supported organic phase is 2.7:1, and a volume ratio of the sulfuric acid solution at a concentration of 1.5 mol/L to the vanadium-supported organic phase is 0.6:1.

In order to make full use of the resources, water for the washing is used for the leaching in (3).

(9) Performing diffusive dialysis on the stripping liquid, recycling the sulfuric solution through a diffusive dialysis membrane to obtain a dialysate, extracting and stripping the dialysate to obtain a secondary stripping liquid, and removing an organic phase from the secondary stripping liquid through an activated carbon adsorption column to obtain the vanadium electrolyte.

In order to obtain the vanadium electrolyte at an appropriate concentration, water and/or a sulfuric acid solution is added into the vanadium electrolyte, so as to adjust a concentration of the vanadium ions in the vanadium electrolyte to 1.5 mol/L and adjust a concentration of sulfate ions to 4.0 mol/L. A mass concentration of the sulfuric acid solution is 90%.

In the diffusive dialysis, a flow rate of the stripping liquid is 0.22*10$^{-3}$ m$^3$/(h·m$^2$), and a ratio of a flow rate of water to the flow rate of the stripping liquid is 1.5:1.

In order to make full use of the resources, the sulfuric acid solution recycled through the diffusive dialysis membrane may be used in (1).

Example 4

A method for preparing a vanadium electrolyte in this example differs from that in Example 1 merely in that the secondary extraction and the stripping are not performed in (9).

In this example, in (9), the diffusive dialysis is performed on the stripping liquid, the sulfuric acid solution is recycled through the diffusive dialysis membrane to obtain the dialysate, and then the organic phase is removed from the dialysate through an activated carbon adsorption column to obtain the vanadium electrolyte.

Example 5

A method for preparing a vanadium electrolyte in this example differs from that in Example 1 merely in that the vanadium-containing ore in (1) is doped with the wet ore material in (4) to form the mixture, and the mass ratio of water to the vanadium-containing ore and the mass ratio of sulfuric acid to the mixture are changed.

In this example, in (1), the vanadium-containing ore is ground into a powder having a particle size of smaller than 2 mm, and a mass ratio of the powder having a particle size of 1 mm to 2 mm to the vanadium-containing ore is more than 50%. The ground vanadium-containing ore is mixed with the wet ore material in (4) at a mass ratio of 1:2.5 to obtain the mixture. Then, water is added into the mixture, a sulfuric acid solution at a mass concentration of 90% is added at a rate of 0.05 mL·min$^{-1}$·g$^{-1}$, and a resultant solution is stirred at a temperature of 50° C. to obtain a mixture.

A mass ratio of water to the mixture is 0.001:1, and a mass ratio of the sulfuric acid solution to the mixture is 1:13.

Example 6

A method for preparing a vanadium electrolyte in this example differs from that in Example 1 merely in that the vanadium-containing ore in (1) is further doped with the wet ore material generated in (4) to form the mixture, water is replaced with the sulfuric acid solution recycled through a countercurrent diffusive dialysis membrane in (9), and the mass ratio of the sulfuric acid solution at a mass concentration of 90% to the vanadium-containing ore is changed.

In this example, in (1), the vanadium-containing ore is ground into a powder having a particle size of smaller than 2 mm, and a mass ratio of the powder having a particle size of 1 mm to 2 mm to the vanadium-containing ore is more than 50%. The ground vanadium-containing ore is mixed with the wet ore material in (4) at a mass ratio of 1:0.6 to obtain the mixture. Then, the sulfuric acid solution recycled through the countercurrent diffusive dialysis membrane in (9) is added into the mixture, a sulfuric acid solution at a mass concentration of 90% is added at a rate of 0.05 mL·min$^{-1}$·g$^{-1}$, and a resultant solution is stirred at a temperature of 50° C. to obtain a mixture.

The sulfuric acid solution recycled through the diffusive dialysis membrane has a concentration of 1.1 mol/L, a mass ratio of the sulfuric acid solution to the mixture is 0.04:1, and a mass ratio of the sulfuric acid solution at a mass concentration of 90% to the mixture is 1:14.

Through the sulfuric acid solution recycled through the countercurrent diffusive dialysis membrane in (9), it is unnecessary to add water, and meanwhile it is able to reduce the content of the sulfuric acid solution at a mass concentration of 90%.

Comparative Examples

The following tests are performed to verify the technical effect of the method for preparing the vanadium electrolyte.

The vanadium electrolytes obtained in Examples 1~4 and comparative examples 1-3 are detected using a method specified in GB/T 37204-2018 "electrolyte for all-vanadium flow battery", so as to obtain their components.

Testing results are shown in the following tables.

Example 1

| Element | TV | VO$^{2+}$:TV | SO$_4^{2-}$ | NH$_4^+$ | Au | As | Si | Al | Ca | Mg | K | Na |
|---|---|---|---|---|---|---|---|---|---|---|---|---|
| Required value | ≥1.50 | ≥0.95 | ≥2.30 | ≤20 | ≤1 | ≤1 | ≤10 | ≤50 | ≤30 | ≤30 | ≤100 | ≤80 |
| Test value | 1.62 | 0.98 | 4.54 | / | / | / | 2.98 | 5.62 | 0.12 | 3.22 | 5.45 | 10.23 |

| Element | Mo | Ni | Fe | Cu | Zn | Pb | Cr | Ti | Mn | pt | Pd | Pt |
|---|---|---|---|---|---|---|---|---|---|---|---|---|
| Required value | ≤20 | ≤20 | ≤50 | ≤1 | / | / | ≤15 | / | ≤5 | ≤1 | ≤1 | ≤1 |
| Test value | 0.23 | / | 15.35 | / | / | / | 4.65 | 0.23 | / | / | / | / |

Example 2

| Element | TV | VO$^{2+}$:TV | SO$_4^{2-}$ | NH$_4^+$ | Au | As | Si | Al | Ca | Mg | K | Na |
|---|---|---|---|---|---|---|---|---|---|---|---|---|
| Required value | ≥1.50 | ≥0.95 | ≥2.30 | ≤20 | ≤1 | ≤1 | ≤10 | ≤50 | ≤30 | ≤30 | ≤100 | ≤80 |
| Test value | 1.55 | 0.97 | 4.62 | / | / | / | 3.56 | 7.82 | 0.89 | 2.32 | 6.42 | 12.23 |

| Element | Mo | Ni | Fe | Cu | Zn | Pb | Cr | Ti | Mn | pt | Pd | Pt |
|---|---|---|---|---|---|---|---|---|---|---|---|---|
| Required value | ≤20 | ≤20 | ≤50 | ≤1 | / | / | ≤15 | / | ≤5 | ≤1 | ≤1 | ≤1 |
| Test value | / | 0.85 | 19.35 | / | / | / | 2.65 | 0.43 | 0.32 | / | / | / |

Example 3

| Element | TV | $VO^{2+}$:TV | $SO_4^{2-}$ | $NH_4^+$ | Au | As | Si | Al | Ca | Mg | K | Na |
|---|---|---|---|---|---|---|---|---|---|---|---|---|
| Required value | ≥1.50 | ≥0.95 | ≥2.30 | ≤20 | ≤1 | ≤1 | ≤10 | ≤50 | ≤30 | ≤30 | ≤100 | ≤80 |
| Test value | 1.65 | 0.96 | 4.52 | / | / | / | 2.56 | 4.82 | 1.25 | 3.32 | 8.42 | 11.23 |

| Element | Mo | Ni | Fe | Cu | Zn | Pb | Cr | Ti | Mn | pt | Pd | Pt |
|---|---|---|---|---|---|---|---|---|---|---|---|---|
| Required value | ≤20 | ≤20 | ≤50 | ≤1 | / | / | ≤15 | / | ≤5 | ≤1 | ≤1 | ≤1 |
| Test value | 0.65 | 1.85 | 14.35 | / | / | / | 0.65 | / | 0.45 | / | / | / |

Example 4

| Element | TV | $VO^{2+}$:TV | $SO_4^{2-}$ | $NH_4^+$ | Au | As | Si | Al | Ca | Mg | K | Na |
|---|---|---|---|---|---|---|---|---|---|---|---|---|
| Required value | ≥1.50 | ≥0.95 | ≥2.30 | ≤20 | ≤1 | ≤1 | ≤10 | ≤50 | ≤30 | ≤30 | ≤100 | ≤80 |
| Test value | 1.45 | 0.965 | 4.43 | / | / | / | 5.3 | 264.49 | 6.91 | 176.33 | 77.44 | 93.10 |

| Element | Mo | Ni | Fe | Cu | Zn | Pb | Cr | Ti | Mn | pt | Pd | Pt |
|---|---|---|---|---|---|---|---|---|---|---|---|---|
| Required value | ≤20 | ≤20 | ≤50 | ≤1 | / | / | ≤15 | / | ≤5 | ≤1 | ≤1 | ≤1 |
| Test value | 0.44 | 1.10 | 39.59 | 0.85 | 12.33 | | 1.08 | 5.39 | 1.47 | / | / | / |

Example 5

| Element | TV | $VO^{2+}$:TV | $SO_4^{2-}$ | $NH_4^+$ | Au | As | Si | Al | Ca | Mg | K | Na |
|---|---|---|---|---|---|---|---|---|---|---|---|---|
| Required value | ≥1.50 | ≥0.95 | ≥2.30 | ≤20 | ≤1 | ≤1 | ≤10 | ≤50 | ≤30 | ≤30 | ≤100 | ≤80 |
| Test value | 1.60 | 0.96 | 4.64 | / | / | / | 2.25 | 3.62 | 1.12 | 3.22 | 4.45 | 14.23 |

| Element | Mo | Ni | Fe | Cu | Zn | Pb | Cr | Ti | Mn | pt | Pd | Pt |
|---|---|---|---|---|---|---|---|---|---|---|---|---|
| Required value | ≤20 | ≤20 | ≤50 | ≤1 | / | / | ≤15 | / | ≤5 | ≤1 | ≤1 | ≤1 |
| Test value | 2.23 | 0.88 | 18.35 | / | 0.86 | / | 1.68 | / | 0.11 | / | / | / |

Example 6

| Element | TV | $VO^{2+}$:TV | $SO_4^{2-}$ | $NH_4^+$ | Au | As | Si | Al | Ca | Mg | K | Na |
|---|---|---|---|---|---|---|---|---|---|---|---|---|
| Required value | ≥1.50 | ≥0.95 | ≥2.30 | ≤20 | ≤1 | ≤1 | ≤10 | ≤50 | ≤30 | ≤30 | ≤100 | ≤80 |
| Test value | 1.70 | 0.96 | 4.54 | / | / | / | 7.12 | 11.62 | 1.82 | 2.92 | 7.45 | 15.23 |

| Element | Mo | Ni | Fe | Cu | Zn | Pb | Cr | Ti | Mn | pt | Pd | Pt |
|---|---|---|---|---|---|---|---|---|---|---|---|---|
| Required value | ≤20 | ≤20 | ≤50 | ≤1 | / | / | ≤15 | / | ≤5 | ≤1 | ≤1 | ≤1 |
| Test value | 1.63 | 1.10 | 15.35 | / | / | / | 1.68 | / | / | / | / | / |

Based on the above, in Example 4, when the stripping is performed for merely one time, it is very difficult for a part of impurity ions in the vanadium electrolyte to meet the requirements specified in GB/T 37204-2018 "electrolyte for all-vanadium flow battery", and the impurity ions in the other examples meet the requirements on a first-grade product in the standard. In Examples 5 and 6, the impurity ions in the other examples meet the requirements on a first-grade product in the standard, and meanwhile the content of acids and water for curing is reduced. As compared with Example 1, it is able to remarkably reduce the content of the sulfuric acid solution at a mass concentration of 90%, thereby to utilize the resources in a better manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for preparing a vanadium electrolyte, comprising:

adding sulfuric acid into vanadium-containing ore, and stirring to obtain a mixture;

curing the mixture to obtain a clinker;

leaching the clinker with water to obtain a vanadium-containing leaching solution;

adding a first impurity-removing agent into the vanadium-containing leaching solution to obtain a first purified solution;

adding an oxidizing agent, a ferric phosphate dihydrate seed crystal and a second impurity-removing agent into the first purified solution to obtain a second purified solution;

adding a reducing agent and a flocculating agent into the second purified solution, and filtering a resultant solution to obtain a filtered solution;

mixing the filtered solution with an extraction liquid to obtain a vanadium-supported organic phase;

stripping the vanadium-supported organic phase to obtain a stripping liquid; and removing an organic phase from the stripping liquid to obtain the vanadium electrolyte.

2. The method according to claim 1, wherein sulfuric acid is a sulfuric acid solution having a mass concentration of 90% to 98%, a mass ratio of the sulfuric acid solution to the vanadium-containing ore is 1:4 to 1:20, and water is added prior to sulfuric acid.

3. The method according to claim 1, wherein the mixture is cured at a temperature of 40° C. to 130° C. for more than 12 h.

4. The method according to claim 1, wherein the first impurity-removing agent is added after adjusting a pH value of the vanadium-containing leaching solution to 1.0 to 2.0, and the first impurity-removing agent is one or more selected from the group consisting of sodium fluoride, potassium fluoride, ammonium fluoride, lithium fluoride, hydrofluoric acid, sodium hexafluorophosphate and potassium hexafluorophosphate.

5. The method according to claim 1, wherein the oxidizing agent is selected from one or more of the group consisting of sodium chlorate, sodium hypochlorite and hydrogen peroxide, and the second impurity-removing agent is one or more selected from the group consisting of phosphoric acid, sodium phosphate, disodium hydrogen phosphate, monosodium hydrogen phosphate, potassium phosphate, dipotassium hydrogen phosphate, monopotassium hydrogen phosphate, and ammonium hydrogen phosphate.

6. The method according to claim 1, wherein the reducing agent is one or more selected from the group consisting of sulfite, sulfur dioxide, elemental sulfur, a zinc powder, an organosulfur compound, oxalate, ascorbic acid and carbon monoxide, and the flocculating agent is one or more selecting the group consisting of polyacrylamide and sodium polyacrylate.

7. The method according to claim 1, wherein the extraction liquid is a mixture of an extraction agent, tributyl phosphate and sulfonated kerosene, and the extraction agent is one or more selected from the group consisting of bis(2-ethylhexyl) phosphate (P204), trioctylamine (N235) and 2-ethylhexyl phosphate 2-ethylhexyl ester (P507).

8. The method according to claim 1, wherein the removing the organic phase from the stripping liquid to obtain the vanadium electrolyte comprises subjecting the stripping liquid to diffusive dialysis to obtain a dialysate, extracting and stripping the dialysate to obtain a secondary stripping liquid, and removing the organic phase from the secondary stripping liquid through an activated carbon adsorption column to obtain the vanadium electrolyte.

9. A vanadium electrolyte prepared through the method according to claim 1.

10. Use of the vanadium electrolyte according to claim 9 in a battery.

* * * * *